(12) United States Patent
Cho

(10) Patent No.: US 8,931,027 B2
(45) Date of Patent: Jan. 6, 2015

(54) MEDIA GATEWAY

(75) Inventor: Keun-Ho Cho, Seoul (KR)

(73) Assignee: iCube Corp., Seoul (KR)

( * ) Notice: Subject to any disclaimer, the term of this patent is extended or adjusted under 35 U.S.C. 154(b) by 834 days.

(21) Appl. No.: 11/575,852

(22) PCT Filed: Jan. 28, 2005

(86) PCT No.: PCT/KR2005/000265
§ 371 (c)(1),
(2), (4) Date: Mar. 22, 2007

(87) PCT Pub. No.: WO2006/033507
PCT Pub. Date: Mar. 30, 2006

(65) Prior Publication Data
US 2007/0297427 A1 Dec. 27, 2007

(30) Foreign Application Priority Data
Sep. 22, 2004 (KR) ........................ 10-2004-0076093

(51) Int. Cl.
*H04N 7/173* (2011.01)
*H04N 7/16* (2011.01)
*H04N 13/00* (2006.01)
*H04N 7/01* (2006.01)
*H04L 12/28* (2006.01)
*H04N 19/40* (2014.01)
*H04N 11/20* (2006.01)
*H04N 21/4402* (2011.01)
*H04N 21/2343* (2011.01)
*H04N 19/70* (2014.01)
*H04N 19/12* (2014.01)

(52) U.S. Cl.
CPC ........ *H04L 12/2854* (2013.01); *H04N 13/0029* (2013.01); *H04N 7/01* (2013.01); *H04N 7/26941* (2013.01); *H04N 11/20* (2013.01); *H04N 21/4402* (2013.01); *H04N 21/234309* (2013.01); *H04N 7/0125* (2013.01); *H04N 19/00884* (2013.01); *H04N 21/440218* (2013.01); *H04N 19/00078* (2013.01)
USPC .......................................... 725/127; 725/149

(58) Field of Classification Search
None
See application file for complete search history.

(56) References Cited

U.S. PATENT DOCUMENTS 4,609,941 A * 9/1986 Carr et al. ................. 375/240.12
5,426,699 A * 6/1995 Wunderlich et al. .......... 380/211
(Continued)

FOREIGN PATENT DOCUMENTS

JP 2003-125009 4/2003
WO 03-056767 7/2003

*Primary Examiner* — Brian T Pendleton
*Assistant Examiner* — Jonathan V Lewis
(74) *Attorney, Agent, or Firm* — H.C. Park & Associates, PLC

(57) ABSTRACT

Disclosed is a media gateway that processes AV signals offered over various channels into AV stream data and wirelessly transmits the AV stream data to a client such as PC or TV The media gateway includes: a broadcast signal receiver for selecting a broadcast signal and dividing the selected broadcast signal into video and audio signals; a video decoder for decoding the video signal into a displayable image signal; an A/D converter for digitally converting the audio signal; an encoder for encoding the digitally converted audio signal and the image signal; a data communication unit for transmitting/receiving AV stream data and a client control command to/from a data communication unit on a client side; and a main processor for controlling a tuner in the broadcast signal receiver according to a client control command conforming to HTTP standards received through the data communication unit and transmitting AV stream data obtained by encoding a broadcast signal of a channel selected by the tuner to a client side.

10 Claims, 3 Drawing Sheets

(56) References Cited

U.S. PATENT DOCUMENTS

| | | | |
|---|---|---|---|
| 5,428,454 A * | 6/1995 | Kimura et al. | 386/230 |
| 5,512,953 A * | 4/1996 | Nahumi | 348/441 |
| 5,550,825 A * | 8/1996 | McMullan et al. | 370/486 |
| 5,550,982 A * | 8/1996 | Long et al. | 725/93 |
| 5,585,858 A * | 12/1996 | Harper et al. | 348/485 |
| 5,724,101 A * | 3/1998 | Haskin | 348/441 |
| 5,864,747 A * | 1/1999 | Clark et al. | 725/67 |
| 5,903,314 A * | 5/1999 | Niijima et al. | 725/44 |
| 5,905,524 A * | 5/1999 | Sauer | 725/54 |
| 5,917,950 A * | 6/1999 | Yim | 382/236 |
| 5,983,071 A * | 11/1999 | Gagnon et al. | 725/72 |
| 6,188,428 B1 * | 2/2001 | Koz et al. | 725/115 |
| 6,305,021 B1 * | 10/2001 | Kim | 725/131 |
| 6,337,716 B1 * | 1/2002 | Yim | 348/554 |
| 6,339,594 B1 * | 1/2002 | Civanlar et al. | 370/352 |
| 6,598,233 B1 * | 7/2003 | Choi | 725/151 |
| 6,711,159 B1 | 3/2004 | Grabelsky et al. | |
| D490,403 S | 5/2004 | Wu et al. | |
| 6,766,377 B1 | 7/2004 | Grabelsky et al. | |
| 6,804,300 B1 * | 10/2004 | Hoshino et al. | 375/240.1 |
| 6,889,385 B1 * | 5/2005 | Rakib et al. | 725/119 |
| 7,116,894 B1 * | 10/2006 | Chatterton | 386/211 |
| 7,155,734 B1 * | 12/2006 | Shimomura et al. | 725/81 |
| 7,260,090 B2 * | 8/2007 | Buswell et al. | 725/119 |
| 7,327,792 B2 * | 2/2008 | Seo | 375/240.27 |
| 7,382,773 B2 * | 6/2008 | Schoeneberger et al. | 370/353 |
| 8,570,446 B2 * | 10/2013 | Ouslis et al. | 348/735 |
| 8,761,604 B2 * | 6/2014 | Lavoie et al. | 398/135 |
| 2002/0027983 A1 | 3/2002 | Suzuki | |
| 2002/0144289 A1 * | 10/2002 | Taguchi et al. | 725/112 |
| 2002/0157103 A1 * | 10/2002 | Song et al. | 725/97 |
| 2002/0159528 A1 * | 10/2002 | Graziani et al. | 375/240.16 |
| 2002/0166119 A1 * | 11/2002 | Cristofalo | 725/34 |
| 2002/0178277 A1 * | 11/2002 | Laksono | 709/231 |
| 2003/0002583 A1 * | 1/2003 | Geerlings | 375/240.12 |
| 2003/0093788 A1 * | 5/2003 | Takenaka | 725/33 |
| 2003/0140353 A1 * | 7/2003 | Hugenberg et al. | 725/148 |
| 2004/0150530 A1 * | 8/2004 | Haruki | 340/825.72 |
| 2004/0257434 A1 * | 12/2004 | Davis et al. | 348/14.13 |
| 2005/0091696 A1 * | 4/2005 | Wolfe et al. | 725/116 |
| 2005/0108766 A1 * | 5/2005 | Hlasny et al. | 725/100 |
| 2005/0149972 A1 * | 7/2005 | Knudson | 725/56 |
| 2005/0246738 A1 * | 11/2005 | Lockett et al. | 725/43 |
| 2006/0242664 A1 * | 10/2006 | Kikkawa et al. | 725/37 |
| 2007/0067816 A1 * | 3/2007 | Van Horck et al. | 725/100 |

\* cited by examiner

MEDIA GATEWAY

This application is the National Stage of International Application No. PCT/KR2005/000265, filed on Jan. 28, 2005, and claims priority from and the benefit of Korean Patent Application No. 10-2004-0076093, filed on Sep. 22, 2004.

FIELD OF THE INVENTION

The present invention relates to a media gateway and, more particularly, to a media gateway that wirelessly transmits audio and visual (AV) sources offered over various types of channels to a client serving as an AV output device.

BACKGROUND OF THE INVENTION

Examples of devices for viewing multimedia data (e.g., DivX, MP3, or MPG) of a personal computer (PC) through a wide screen television (TV) with high-definition capability include "Radio-Signal Remote Relaying System" and "Multicontent Playback System", which are disclosed in patent applications previously filed by the present applicant.

Such a radio-signal remote relaying system or multicontent playback system wirelessly transmits multimedia data contained in PC to a remote TV or audio player. Accordingly, there is an advantage in that the multimedia data contained in PC can be viewed or heard at remote places, while a restriction is imposed that the multimedia data should be stored in the PC.

That is, given that AV signals are offered through various types of channels such as satellite broadcasting, cable broadcasting, on-air broadcasting, or digital versatile disc player (DVDP), the above-mentioned radio-signal remote relaying system or multicontent playback system is used very restrictively.

Accordingly, a new transmitter is required to be developed which can transmit broadcast signals or AV signals provided through various types of channels, such as satellite broadcasting, cable broadcasting, or on-air broadcasting, to TVs or computers at remote locations via wireless or wireline connections, so that users can conveniently view AV sources provided through various types of channels regardless of locations.

SUMMARY OF THE INVENTION

The present invention provides a media gateway capable of transmitting various types of analog AV signals offered over various types of channels to a client serving as an AV output device.

The present invention further provides a media gateway capable of transmitting signals generated by remotely controlling devices offering AV sources according to user's instructions to a client serving as an AV output device.

In accordance with an aspect of the present invention, there is provided a media gateway comprising: a broadcast signal receiver for selecting a broadcast signal and dividing the selected broadcast signal into video and audio signals; a video decoder for decoding the video signal into a displayable image signal; an A/D converter for digitally converting the audio signal; an encoder for encoding the digitally converted audio signal and the image signal; a data communication unit for transmitting/receiving AV stream data and a client control command to/from a data communication unit on a client side; and a main processor for controlling a tuner in the broadcast signal receiver according to a client control command conforming to HTTP standards received through the data communication unit and transmitting AV stream data obtained by encoding a broadcast signal of a channel selected by the tuner to a client side.

In accordance with another aspect of the present invention, there is provided a media gateway comprising: a broadcast signal receiver for selecting a broadcast signal and dividing the selected broadcast signal into video and audio signals; a video source selection unit for selecting either a video signal input terminal or a video signal output terminal of the broadcast signal receiver; an audio source selection unit for selecting either an audio signal input terminal or an audio signal output terminal of the broadcast signal receiver; a video decoder for decoding an output of the video source selection unit into a displayable image signal; an A/D converter for digitally converting an output of the audio source selection unit; an encoder for encoding the digitally converted audio signal and the image signal; a data communication unit for transmitting/receiving AV stream data and a client control command to/from a data communication unit on a client side; and a main processor for selecting the video and audio sources according to a client control command conforming to HTTP standards received through the data communication unit, processing AV stream data obtained by encoding the selected source according to HTTP or RTP standards, and transmitting the processed AV stream data to a client side through the data communication unit.

According to the present invention, a user can view media sources offered from various types of channels through a client serving as a media output device, since a broadcast signal selected through a broadcast signal receiver or external AV signals inputted through video and audio signal input terminals are MPEG-decoded and then transmitted in stream format to the client (PC or TV) equipped with a LAN card or wireless LAN card.

BRIEF DESCRIPTION OF THE DRAWINGS

The present invention will become more apparent by describing in detail exemplary embodiments thereof with reference to the attached drawings in which.

DETAILED DESCRIPTION OF THE PREFERRED EMBODIMENT

Exemplary embodiments in accordance with the present invention will now be described in detail with reference to the accompanying drawings.

Figure 1:
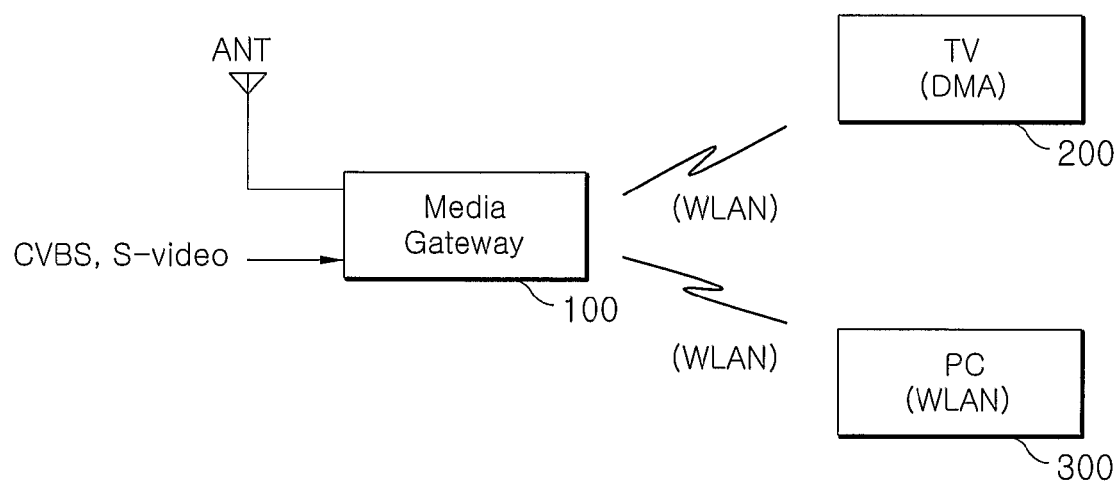
FIG. 1 is a block diagram showing a system related to a media gateway in accordance with the present invention.

FIG. 1 is a block diagram showing a system related to a media gateway in accordance with the present invention.

In general, a media gateway 100 receives broadcast signals of a broadcast channel selected by a user, processes the selected broadcast signals into AV stream data, and transmits the AV stream data to client devices (e.g., TV or PC) via wireless or wireline connections. The media gateway 100 can compress composite video blanking sync (CVBS) or S-Video signal inputted through at least one video signal input terminal of the media gateway 100 into AV stream data and transmit the AV stream data to the client devices (e.g., TV or PC) via wireless or wireline connections.

Examples of the client devices include a TV 200 which can perform data interfacing with a digital media adaptor (DMA), and a PC 300 equipped with a wireless LAN communication unit (or LAN card). The DMA basically comprises a wireless LAN communication unit (or LAN card) for receiving AV stream data from the media gateway 100, and an MPEG decoder for decoding the received AV stream data. The AV stream data decoded in the MPEG decoder is transmitted to TV.

A detailed description will now be given of a construction of the media gateway 100 with reference to FIGS. 2 and 3.

Figure 2:
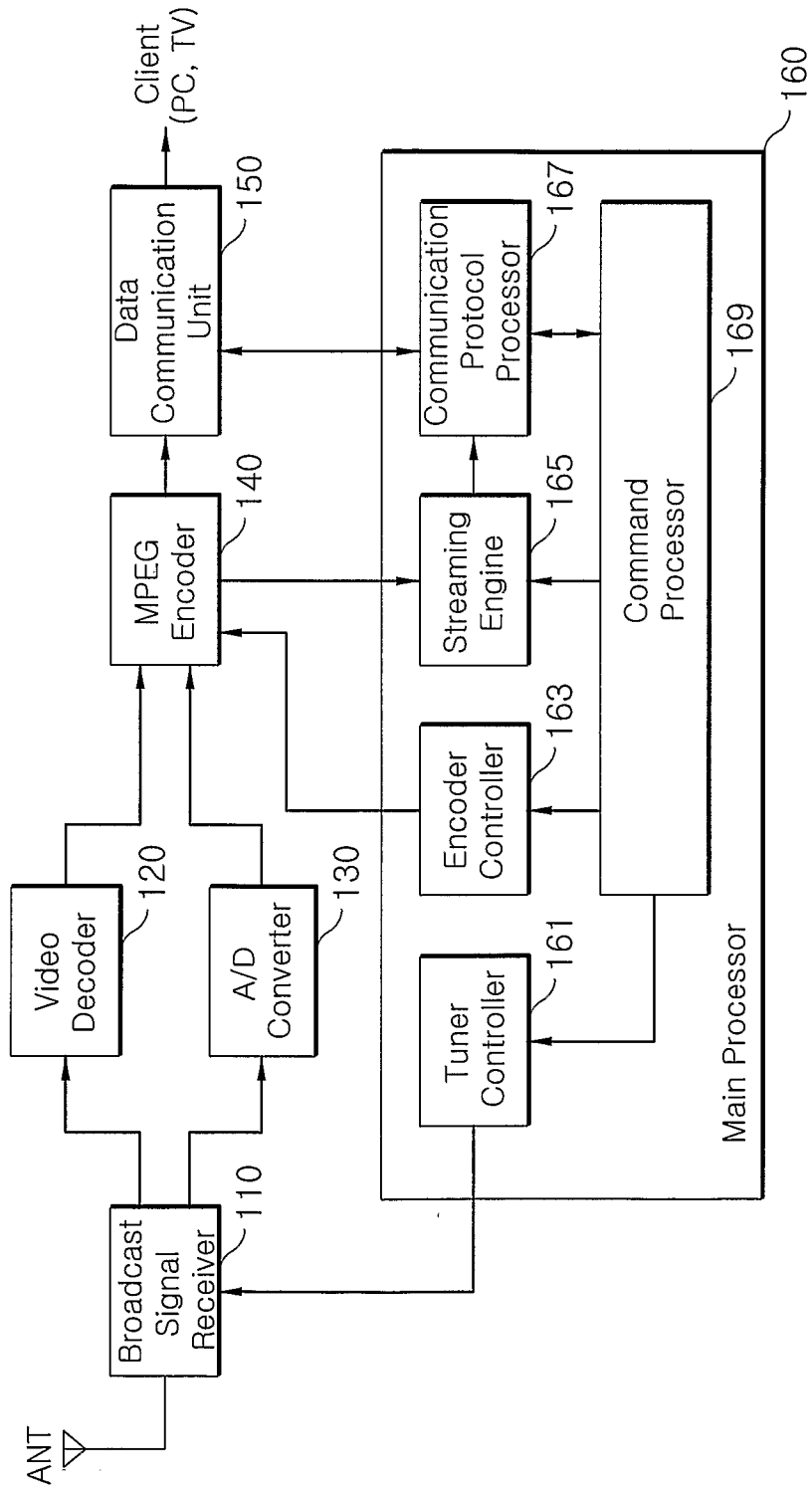
FIG. 2 is a block diagram showing a construction of a media gateway in accordance with an embodiment of the present invention.

FIG. 2 shows a construction of the media gateway 100 of FIG. 1. The media gateway 100 comprises a broadcast signal receiver 110 for selecting broadcast signals and dividing the selected broadcast signals into video and audio signals, and a video decoder 120 for decoding the divided video signals into displayable image signals (chrominance signal, or luminance and color difference signals). The broadcast signal receiver 110 comprises a tuner, an intermediate frequency processor, and an audio signal divider. An A/D converter (not shown) is located at the preceding stage of the video decoder 120.

The media gateway 100 further comprises an A/D converter 130 for digitally converting audio signals outputted from the broadcast signal receiver 110, an MPEG encoder 140 for encoding the audio signals digitally converted in the A/D converter 130 and the image signals, and a data communication unit 150 for transmitting/receiving AV stream data and client control commands to/from data communication units of the clients 200 and 300. The data communication unit 150 includes wireless/wireline communication units and can include wireless LAN card and/or LAN card.

In addition, the media gateway 100 further comprises a main processor 160 for controlling a tuner of the broadcast signal receiver 110 according to client control commands conforming to HTTP standards received through the data communication unit 150 and transmitting AV stream data obtained from broadcast signals of a broadcast channel selected by the tuner to the data communication units of the clients 200 and 300, which have requested channel selection through the data communication unit 150, according to HTTP or RTP standards.

As shown in FIG. 2, the main processor 160 comprises a streaming engine 165 for segmenting AV encoding data outputted from the MPEG encoder 140 into frames and outputting AV stream data obtained by assigning timestamps to the frames, and a communication protocol processor 167 for interpreting client control commands conforming to HTTP standards, processing the AV stream data according to HTTP or RTP standards, and outputting the processed AV stream data to the data communication unit 150.

The main processor 160 further comprises a tuner controller 161 for controlling a tuner in the broadcast signal receiver 110, an encoder controller 163 for controlling the MPEG encoder 140, and a command processor 169 for processing the client control commands interpreted in the communication protocol processor 167. The command processor 169 controls the tuner controller 161, the encoder controller 163, and the streaming engine 165 according to the client control commands, Operation of the media gateway 100 having the above-mentioned construction will now be described.

First, a user can issue a command to select a broadcast channel using a remote control. Such a channel selection command is sent to a DMA connected to TV and then sent to the media gateway 100 as a client control command through a wireless LAN communication unit which is an example of a data communication unit. The client control command transmitted from the DMA to the media gateway 100, e.g., a broadcast channel selection command, can be sent in the form of URL information conforming to HTTP standards. For example, assuming that a user selects channel 12, the broadcast channel selection command is sent in the form of http://192.168.1.100:65432/mgate/input?tuner=12. Here, the figure "12" in the URL information conforming to HTTP standards is information about a broadcast channel, while the preceding command "tuner" is one related to an image source. As described below, if the user selects CVBS as an image source, a "composite" command will be used in place of "tuner".

When the broadcast channel selection command conforming to HTTP standards is sent to the media gateway 100, the broadcast channel selection command is interpreted in the communication protocol processor 167 and in turn applied to the command processor 169. That is, when the command processor 169 sends the applied channel selection information "12" to the tuner controller 161, the tuner controller 161 controls the broadcast signal receiver 110 so that the broadcast channel "12" can be selected.

Broadcast signals transmitted through the broadcast channel "12" are selected under the control of the broadcast signal receiver 110. The selected broadcast signals are divided into video and audio signals, which are in turn applied to a video decoder 120 and an A/D converter 130, respectively. Accordingly, displayable image signals and digitally converted audio signals are applied to the MPEG encoder 140.

Meanwhile, the image and audio signals applied to the MPEG encoder 140 are encoded into AV encoding data according to a moving image compression algorithm, e.g., MPEG 4 algorithm, and then outputted to the streaming engine 165. The streaming engine 165 outputs AV stream data obtained by segmenting the AV encoding data into frames and assigning timestamps to the frames.

The AV stream data is processed according to HTTP or RTP standards in the communication protocol processor 167 and wirelessly transmitted to the client 200 through the data communication unit 150.

Accordingly, the DMA of the client 200 MPEG-decodes the received AV stream data and outputs the resultant data to TV so that the user can view images through the TV channel 12.

A description will now be given of the media gateway 100 for receiving video signals (CVBS, S-Video) offered by various AV sources (e.g., DVDP or DVCR) and in turn wirelessly transmitting the signals to the neighboring client devices 200 and 300.

Figure 3:
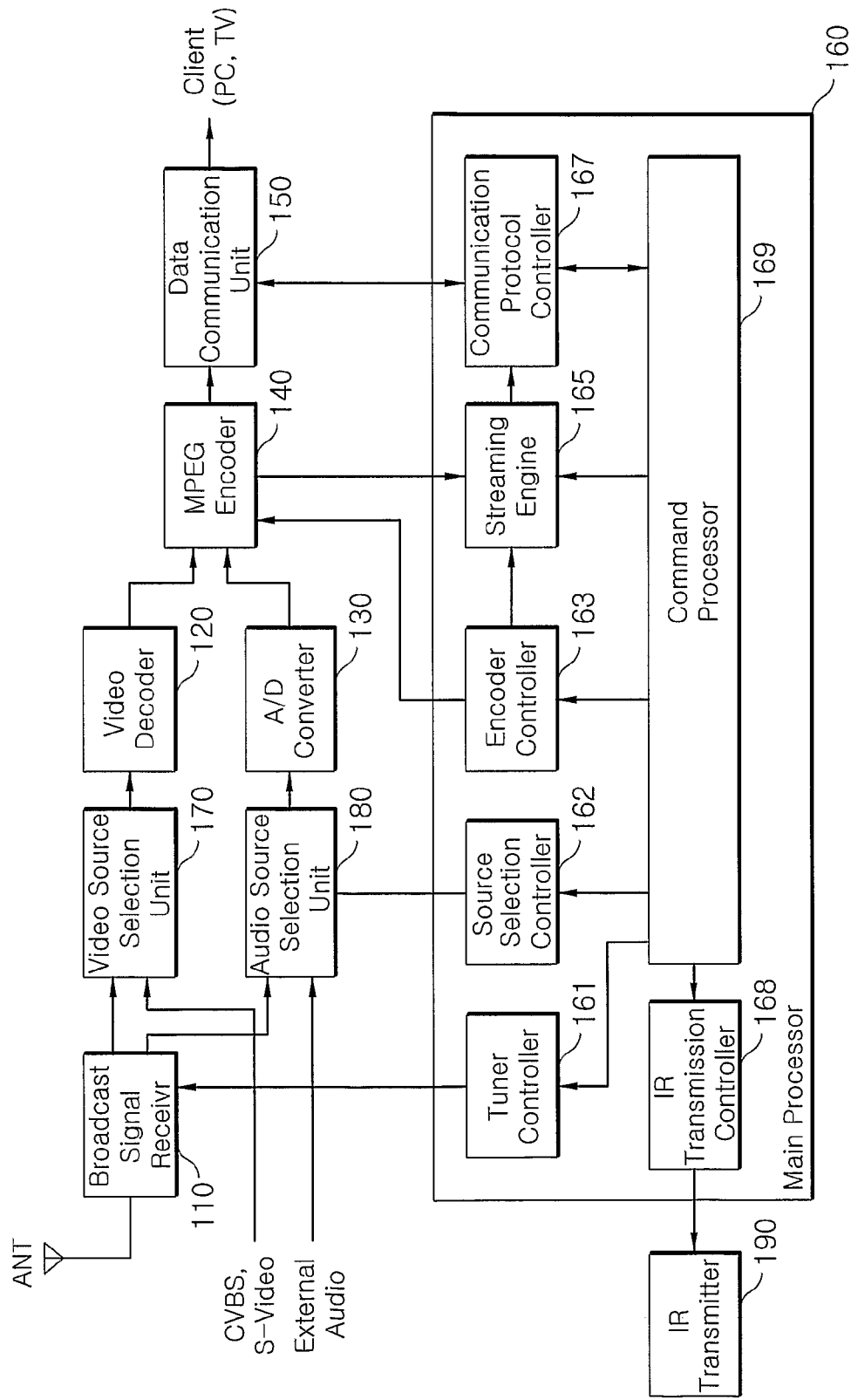
FIG. 3 is a block diagram showing a construction of a media gateway in accordance with another embodiment of the present invention.

FIG. 3 shows another construction of the media gateway 100 shown in FIG. 1. The construction of the media gateway 100 in FIG. 3 is similar to that of the media gateway in FIG. 2 except that the media gateway shown in FIG. 3 further includes a video source selection unit 170, an audio source selection unit 180, a source selection controller 162, an IR transmitter 190, and an IR transmission controller 168.

The video source selection unit 170 selectively outputs a video signal outputted through an output terminal of the broadcast signal receiver 110 and a video signal inputted through at least one video signal input terminal (CVBS, S-Video) under the control of the source selection controller 162. The video source selection unit 170 is also referred to as a video switch.

The above-mentioned "at least one video signal input terminal" denotes a CVBS signal input terminal and an S-Video signal input terminal. The CVBS and S-Video signals will be hereinafter generally referred to as "video signals".

In addition, the audio source selection unit 180 selectively outputs an audio signal outputted through the output terminal of the broadcast signal receiver 110 and an external audio signal under the control of the source selection controller 162.

Meanwhile, the main processor 160 including the source selection controller 162 is responsible for selecting any one of video and audio sources according to the client control command conforming to HTTP standards received through the data communication unit 150, and transmitting AV stream data obtained from the selected source to data communication units of the clients 200 and 300 through the data communication unit 150 according to HTTP or RTP standards.

The main processor 160 further comprises the source selection controller 162 in addition to components included in the main processor 160 shown in FIG. 2. The source selection controller 162 controls switching between the video source selection unit 170 and the audio source selection unit 180 according to a source selection command transmitted from the command processor 169.

The main processor 160 may further comprise the IR transmission controller 168. The IR transmission controller 168 controls the IR transmitter 190 according to an IR transmission control command transmitted from the command processor 169. The IR transmitter 190 sends an IR signal for remote controlling an AV source providing unit connected via a cable with the video signal input terminal (CVBS, S-Video).

The IR transmission control command refers to a remote control signal for remote controlling AV source playback devices such as DVDP or DVCR. The IR transmission control command is first generated through a remote control and sent through a DMA to the media gateway 100 in accordance with an embodiment of the present invention.

Accordingly, the main processor 160 of the media gateway 100 can control the IR transmitter 190 according to the transmitted remote control signal, so that a user can remotely control the AV source playback device through the DMA and the media gateway 100.

Operation of the media gateway 100 will now be described with reference to FIG. 3.

First, a user issues a command to select an S-Video input through a remote control. This command is referred to as a video source selection command which is different from the broadcast channel selection command and CVBS input selection command. That is, the video source selection command is sent to the DMA connected to TV and then sent to the media gateway 100 as a client control command through a wireless LAN communication unit. The video source selection command transmitted from the DMA to the media gateway 100 is transmitted in the form of URL information conforming to HTTP standards as described above, e.g., http://192.168.1.100:65432/mgate/input?svideo=1".

When the video source selection command conforming to HTTP standards is sent to the media gateway 100, the video source selection command is interpreted in the communication protocol controller 167 and applied to the command processor 169. Accordingly, when the command processor 169 sends the applied video source selection command to the source selection controller 162, the source selection controller 162 controls switching between the video source selection unit 170 and the audio source selection unit 180 so that the S-Video input and the external audio input can be selected.

Accordingly, video signals inputted through the S-Video input terminal are applied to the video decoder 120 through the video source selection unit 170, decoded into displayable image signals, and then applied to the MPEG encoder 140.

The MPEG encoder 140 processes the applied image signals and digitally converted audio signals into AV encoding data according to a moving image compression algorithm and outputs the AV encoding data to the streaming engine 165. The streaming engine 165 outputs the AV stream data obtained by segmenting the AV encoding data into frames and assigning timestamps to the frames.

The AV stream data is processed in the communication protocol controller 167 according to HTTP or RTP standards, and wirelessly transmitted to the client 200 through a wireless LAN communication unit which is an example of the data communication unit 150.

Accordingly, the DMA of the client 200 MPEG-decodes the received AV stream data and outputs the resultant data to TV so that a user can view the S-Video signal and audio signal outputted from a video source playback device through TV.

The user can select and view the CVBS input according to the above-mentioned method, although not described in the above embodiment.

As apparent from the above description, since the media gateway in accordance with an embodiment of the present invention encodes video signals of various channels such as CVBS and S-Video as well as broadcast signals and transmits the encoded signals to client devices, such as TV or PC, at remote locations via wireless/wireline connections, a user can conveniently view video/audio signals offered from various channels, regardless of locations.

Further, the user can remotely control a media gateway to control AV source playback devices neighboring to the media gateway at remote locations so that the user can conveniently view the signals generated by the remote control at a remote location.

While the present invention has been described with reference to exemplary embodiments thereof, it will be understood by those skilled in the art that various changes in form and details may be made therein without departing from the scope of the present invention as defined by the following claims.

What is claimed is:

1. A media gateway, comprising:
    a video signal inlet configured to receive video broadcast media according to at least two different video transmission standards via at least two different input terminals, respectively;
    a broadcast signal receiver configured to select, in response to a client control command, a video broadcast medium according to one video transmission standard from among the video broadcast media according to the at least two different video transmission standard to receive a broadcast signal corresponding to the selected video broadcast medium, and to divide the broadcast signal into video and audio signals;
    a video decoder configured to decode the video signal into a displayable image signal;
    an analog-to-digital (A/D) converter configured to digitally convert the audio signal;
    an encoder configured to encode the digitally converted audio signal and the image signal;
    a data communicator configured to receive Audio-video (AV) stream data from the encoder and to transmit AV stream data to a data communication unit on a client side, and to receive the client control command from the data communication unit on the client side and to transmit the client control command; and
    a main processor configured to receive the client control command transmitted from the data communication unit, to control a tuner in the broadcast signal receiver to select the video broadcast medium according to the client control command received through the data communication unit, and to transmit the AV stream data obtained by encoding the broadcast signal of the channel selected by the tuner to the client side, wherein the at least two different input terminals are configured to receive a CVBS (Composite Video Blanking Sync) signal and an S-Video (Separate-Video) signal, respectively.

2. The media gateway of claim 1, wherein the main processor comprises:
   a streaming engine configured to output the AV stream data obtained by segmenting AV encoding data outputted from the encoder into frames and assigning timestamps to the frames;
   a communication protocol processor configured to interpret the client control command, to process the AV stream data according to Hypertext Transfer Protocol (HTTP) or Real-time Transfer Protocol (RTP), and to transmit the AV stream data to the data communication unit;
   a tuner controller configured to control the tuner;
   an encoder controller configured to control the encoder; and
   a command processor configured to process the client control command interpreted in the communication protocol processor.

3. The media gateway of claim 2, wherein the data communicator comprises at least one of a local area network (LAN) card and a wireless LAN card.

4. The media gateway of claim 1, wherein the data communicator comprises at least one of a LAN card and a wireless LAN card.

5. The media gateway of claim 1, wherein the selected video broadcast medium comprises satellite broadcast, cable broadcast, or on-air broadcast.

6. A media gateway, comprising:
   a video signal inlet configured to receive video broadcast media according to at least two different video transmission standards via at least two different input terminals, respectively;
   a broadcast signal receiver configured to select, in response to a client control command, a video broadcast medium according to one video transmission standard from among the video broadcast media according to the at least two different video transmission standards to receive a broadcast signal corresponding to the selected video broadcast medium, and to divide the received broadcast signal into video and audio signals;
   a video source selector configured to receive the video signal from the broadcast signal receiver and an external video signal, and select either the video signal or the external video signal as a video source;
   an audio source selector configured to receive the audio signal from the broadcast signal receiver and an external audio signal, and select either the audio signal or the external audio signal as an audio source;
   a video decoder configured to decode an output of the video source selection unit into a displayable image signal;
   an analog-to-digital (A/D) converter configured to digitally convert an output of the audio source selection unit;
   an encoder configured to encode the digitally converted audio signal and the image signal;
   a data communicator configured to receive Audio-video (AV) stream data from the encoder and to transmit AV stream data to a data communication unit on a client side, and to receive the client control command from the data communication unit on the client side and to transmit the client control command; and
   a main processor configured to receive the client control command transmitted from the data communication unit, to select the video and audio sources according to the client control command received through the data communication unit, to process the AV stream data obtained by encoding the selected source according to HTTP or Real-time Protocol (RTP), and to transmit the AV stream data to the client side through the data communication unit, wherein the at least two different input terminals are configured to receive a CVBS (Composite Video Blanking Sync) signal and an S-Video (Separate-Video) signal, respectively.

7. The media gateway of claim 6, further comprising an infrared (IR) transmitter configured to remotely control an AV source connected via a cable to the video signal input terminal.

8. The media gateway of claim 7, wherein the main processor comprises:
   a streaming engine configured to output the AV stream data obtained by segmenting the AV encoded data outputted from the encoder into frames and assign timestamps to the frames;
   a communication protocol processor configured to interpret the client control command, process the AV stream data according to HTTP or RTP, and transmit the AV stream data to the data communication unit;
   a tuner controller configured to control a tuner in the broadcast signal receiver;
   an encoder controller configured to control the encoder;
   an IR transmission controller configured to control the IR transmitter; and
   a command processor configured to process the client control command interpreted in the communication protocol processor.

9. The media gateway of claim 6, wherein the main processor comprises:
   a streaming engine configured to output the AV stream data obtained by segmenting the AV encoded data output from the encoder into frames and to assign timestamps to the frames;
   a communication protocol processor configured to interpret the client control command, to process the AV stream data according to HTTP or RTP, and to transmit the AV stream data to the data communication unit;
   a tuner controller configured to control a tuner in the broadcast signal receiver;
   an encoder controller configured to control the encoder;
   a source selection controller configured to control the video source selection unit and the audio source selection unit; and
   a command processor configured to process the client control command interpreted in the communication protocol processor.

10. The media gateway of claim 6, wherein the selected video broadcast medium comprises satellite broadcast, cable broadcast, or on-air broadcast.

* * * * *